(12) United States Patent
Kinder

(10) Patent No.: US 8,301,666 B2
(45) Date of Patent: Oct. 30, 2012

(54) EXPOSING FILE METADATA AS LDAP ATTRIBUTES

(75) Inventor: Nathan G. Kinder, Castro Valley, CA (US)

(73) Assignee: Red Hat, Inc., Raleigh, NC (US)

( * ) Notice: Subject to any disclaimer, the term of this patent is extended or adjusted under 35 U.S.C. 154(b) by 660 days.

(21) Appl. No.: 11/515,237

(22) Filed: Aug. 31, 2006

(65) Prior Publication Data

US 2008/0059525 A1  Mar. 6, 2008

(51) Int. Cl.
*G06F 7/00* (2006.01)
*G06F 17/30* (2006.01)

(52) U.S. Cl. .................................... 707/803
(58) Field of Classification Search ............ 707/100, 707/769, 803, 999.1
See application file for complete search history.

(56) References Cited

U.S. PATENT DOCUMENTS

| | | | |
|---|---|---|---|
| 6,463,440 B1 * | 10/2002 | Hind et al. ................... 707/102 |
| 6,484,177 B1 * | 11/2002 | Van Huben et al. ............ 707/10 |
| 6,587,856 B1 * | 7/2003 | Srinivasan et al. ............ 707/102 |
| 6,635,089 B1 | 10/2003 | Burkett et al. |
| 6,850,928 B1 * | 2/2005 | McClure et al. ................... 1/1 |
| 6,920,455 B1 * | 7/2005 | Weschler ........................ 707/100 |
| 7,188,094 B2 * | 3/2007 | Excoffier et al. ................. 707/1 |
| 2001/0051948 A1 * | 12/2001 | Srinivasan et al. ............ 707/102 |
| 2002/0033844 A1 * | 3/2002 | Levy et al. .................... 345/744 |
| 2003/0191757 A1 * | 10/2003 | Ambrosini et al. ............... 707/3 |
| 2005/0021498 A1 * | 1/2005 | Boreham et al. .................. 707/1 |
| 2005/0216485 A1 * | 9/2005 | Bell et al. ...................... 707/100 |
| 2005/0289111 A1 * | 12/2005 | Tribble et al. .................... 707/1 |
| 2006/0015527 A1 * | 1/2006 | Dingle ........................ 707/103 X |
| 2006/0085406 A1 * | 4/2006 | Evans et al. ....................... 707/3 |

OTHER PUBLICATIONS

Brian Arkills, "LDAP Directories Explained: An Introduction and Analysis", Feb. 20, 2003, Addison-Wesley Professional.*

* cited by examiner

*Primary Examiner* — Cam Truong
(74) *Attorney, Agent, or Firm* — Lowenstein Sandler PC

(57) ABSTRACT

A method and apparatus for providing virtual Lightweight Directory Access Protocol (LDAP) attribute subtypes based on metadata associated with a relevant data type. In one embodiment, the method includes receiving a data request indicating an LDAP attribute having one or more attribute values associated with at least one data type. The method further includes determining metadata corresponding to the data type, and identifying attribute subtypes for the attribute based on the metadata corresponding to the data type.

18 Claims, 8 Drawing Sheets

EXPOSING FILE METADATA AS LDAP ATTRIBUTES

TECHNICAL FIELD

Embodiments of the present invention relate to a Lightweight Directory Access Protocol (LDAP), and more specifically to providing LDAP attribute subtypes based on metadata associated with a relevant data type.

BACKGROUND

Light Weight Directory Access Protocol (LDAP) has become very popular due to its efficient and fast data access. A large number of applications/services are currently being developed which use an LDAP directory as their centralized data repository.

In the LDAP directory, data is stored as entries including key/value pairs. A key/value pair may consist of an attribute name and an attribute value. For example, an entry for an attribute known as a file type attribute may include a specific file type as the attribute name and the content of the file as the attribute value.

Some file types may include a set of metadata stored inside the file. For example, jpegphoto Exchangeable Image File Format (EXIF) used for compressed digital camera images includes multiple metadata fields for describing properties of an image stored in the file. These properties may specify the date when the picture was taken, the camera model used for taking the picture, the vertical and horizontal size of the picture, etc. This additional information might be useful for performing searches of the LDAP directory. However, no efficient mechanism currently exists for searching LDAP directory entries based on specific metadata properties stored inside the files.

BRIEF DESCRIPTION OF THE DRAWINGS

The present invention is illustrated by way of example, and not by way of limitation, in the figures of the accompanying drawings and in which.

DETAILED DESCRIPTION

Figure 1:
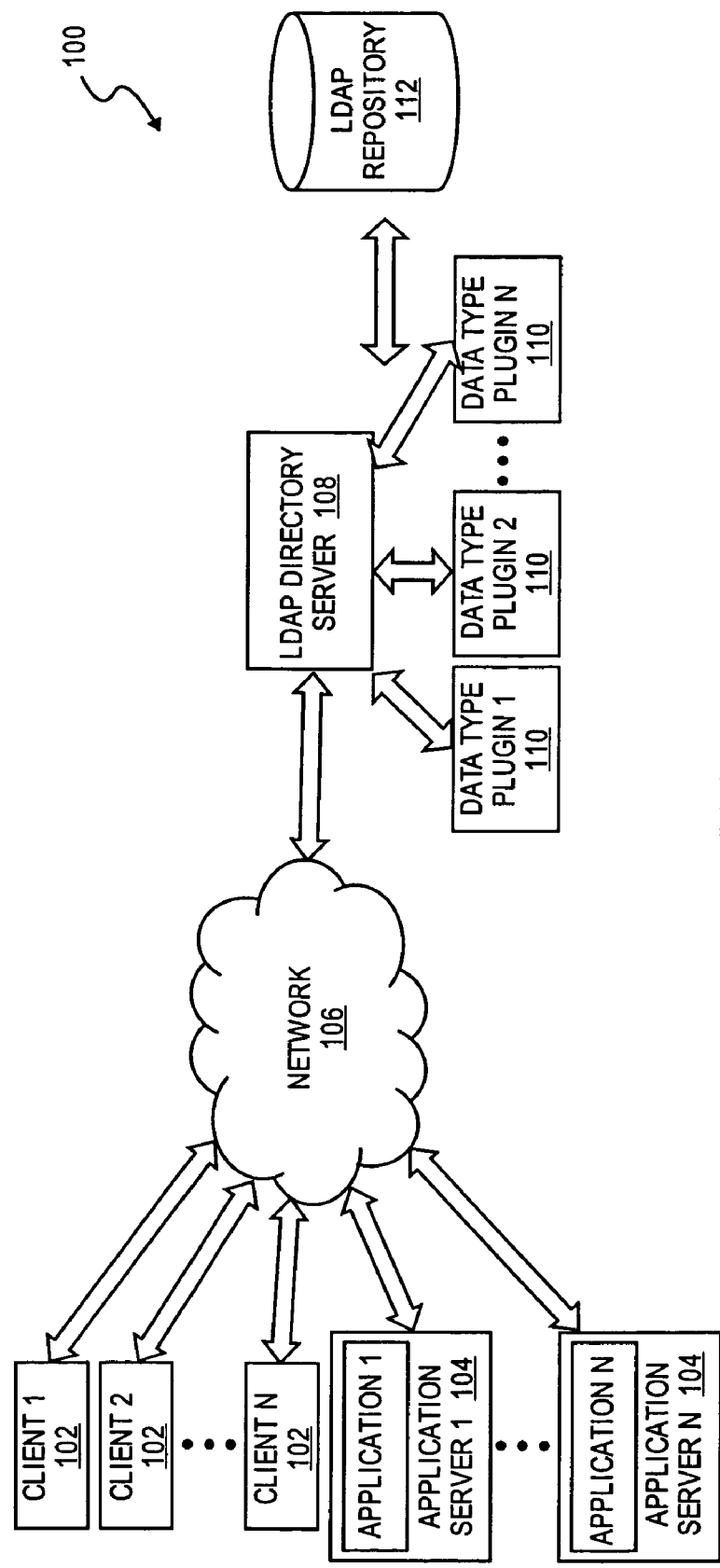
FIG. 1 illustrates a network architecture in which embodiments of the present invention may be implemented.

Described herein is a method and apparatus for providing Lightweight Directory Access Protocol (LDAP) attribute subtypes based on metadata associated with a relevant data type. In one embodiment, an LDAP directory server receives a data request indicating an LDAP attribute that has an attribute value(s) associated with a particular data type(s). The data type represents a generic class of data such as text document, binary document, image, photo, audio, video, etc. Upon receiving the data request, the LDAP directory server determines metadata that corresponds to the data type, and uses this metadata to identify attribute subtypes for the attribute indicated in the data request. The attribute subtypes may be virtual attribute subtypes or attribute subtypes stored in an LDAP repository.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; etc.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), etc.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similarly to the clients 102, the application servers 104 may communicate with the LDAP directory server 112 directly or via a web server.

The LDAP repository 112 may be part of the LDAP directory server 108, or it may reside externally (e.g., on a database server). The LDAP repository 112 may contain a tree of data entries, each of which includes an attribute name and an attribute value. Attributes may be further specialized through subtypes. For example, "language" and "title" may be subtypes of the attribute "common name." When performing a search of the LDAP repository 112, a search request may specify the base attribute to retrieve data entries with all subtypes of this attribute or it may specify a certain subtype, in addition to the base attribute, to retrieve only data entries that match the specified subtype of the attribute.

The content of an attribute value may be data of a particular type. This data type may correspond to a generic class of data such as document (e.g., text or binary), image, photo, audio, video, etc. Data of a specific data type may be associated with a set of metadata that describes properties of the stored data. For example, photo data may include metadata that specifies the date when the picture was taken, the camera model used for taking the picture, the vertical and horizontal size of the picture, etc. In another example, binary document data such as digital certificate data may include multiple metadata fields for describing properties of the user certificate (e.g., the user name, the authority that issued the certificate, the date of issuance, etc.). The format of metadata may depend on the type of the file storing the data of a specific type. For example, different file types used for storing photographs (e.g., JPEG, JIF and PNG file types) may have different formats for corresponding metadata.

In one embodiment, the LDAP directory server 108 includes logic that identifies metadata associated with a specific data type and exposes this metadata as attribute subtypes. For example, the LDAP directory server 108 may identify metadata corresponding to the photo data type, analyze this metadata, and create attribute subtypes for the attribute "photo" based on properties included in the metadata.

In one embodiment, the LDAP directory server 108 uses plugins 100 for providing the above functionality. In particular, data type plugins 110 may be coupled to the LDAP directory server 108 to identify metadata corresponding to different data types and expose the identified metadata as virtual attribute subtypes. For example, data type plugin 1 may be used for photo data type, data type plugin 2 may be used for audio data type, data type plugin N may be used for binary document data type, etc. As will be discussed in more detail below, in one embodiment, when the LDAP directory server 108 receives a data request indicating a data type supported by any of the data type plugins 110, the LDAP directory server 108 calls an appropriate data type plugin 110 to obtain information on attribute subtypes for the indicated data type. The attribute subtypes may be stored in the LDAP directory 112. Alternatively, the attribute subtypes are "virtual" as they are not explicitly stored in the LDAP repository 112 but are, instead, identified by a corresponding data type plugin 110 on-the-fly when reading metadata corresponding to a specific data type.

The LDAP directory server 108 may receive various kinds of data requests from clients 102 and/or application servers 104. In response, depending on the nature of the data request, the LDAP directory server 108 may call a relevant data type plugin 110 to perform a predefined task. For example, when receiving a request for data entries matching an attribute subtype of an attribute associated with a specific data type, the LDAP directory server 108 may call a relevant data type plugin 110 to find the matching entries. Alternatively, if the LDAP directory server 108 receives a data request for a list of attribute subtypes of an attribute associated with a particular data type, it may call a relevant data type plugin 110 to provide a list of attribute subtypes. In yet another example, if the LDAP directory server 108 receives a request specifying the content to be added as the value of an attribute, the LDAP directory server 108 may call a relevant data type plugin 110 to index the metadata within the specified content. The indexed metadata may then be used by the LDAP directory server 108 to search the LDAP repository 112 for matching attribute subtypes.

In an alternative embodiment, plugins 110 may perform more specialized tasks. In particular, each plugin 110 may be associated with a specific file type (as opposed to a data type). For example, data type plugin 1 may be used exclusively for jpegphoto EXIF files, data type plugin 2 may be used exclusively for PNG files, data type plugin N may be used for userCertificate files, etc.

It should be noted that the term "plugin" as used herein is not limited to a specific kind of a computer program but rather represents any module having processing logic 1026 for performing functionality discussed herein. This module may be part of the LDAP directory server 108 or some other machine.

In software implementations, this module may be an independent computer program or a portion of a computer program.

Figure 2:
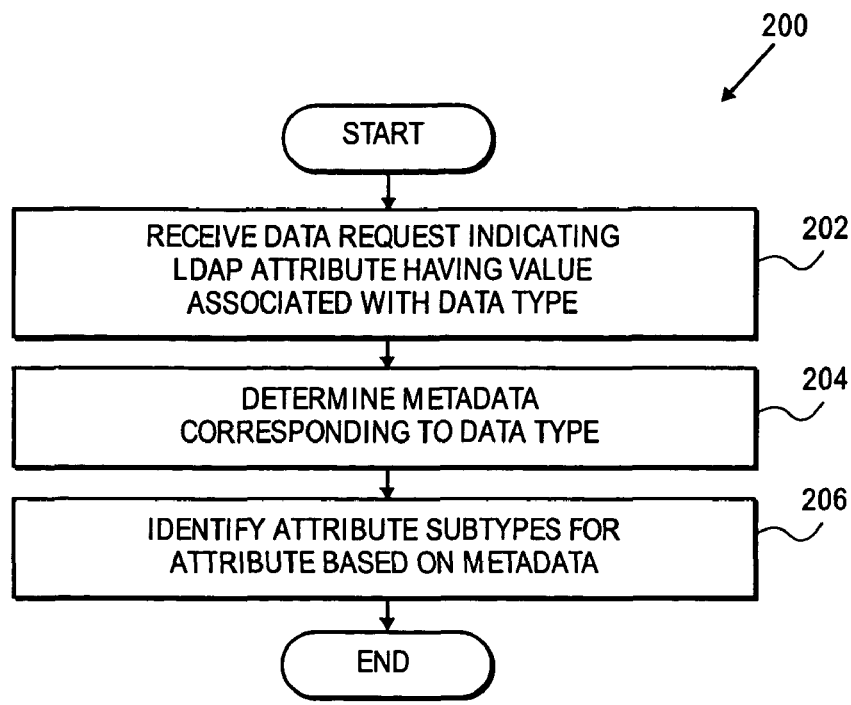
FIG. 2 is a flow diagram of one embodiment of a method for providing virtual LDAP attribute subtypes based on metadata associated with a relevant data type.

FIG. 2 illustrates a flow diagram of one embodiment of a method 200 for providing virtual LDAP attribute subtypes based on metadata associated with a relevant data type. The method may be performed by processing logic 1026 of FIG. 10 that may comprise hardware (e.g., circuitry, dedicated logic, programmable logic, microcode, etc.), software (such as instructions run on a processing device), or a combination thereof. In one embodiment, method 200 is performed by the LDAP directory server 108 of FIG. 1.

Referring to FIG. 2, process 200 begins with processing logic receiving a data request indicating an attribute having values associated with a specific data type (block 202). For example, the data request may specify the attribute "photo" whose values store data of a photo data type. The data request may be, for example, a request for data entries matching an attribute subtype of an attribute associated with a specific data type, a data request for a list of attribute subtypes of an attribute associated with a specific data type, a data request specifying data of a specific type to be added as the contents of a particular attribute, a request for a value of an attribute subtype of an attribute associated with a specific data type, etc.

At block 204, processing logic determines metadata corresponding to the data type indicated in the request. Processing logic may determine the metadata by first identifying the data format used for storing values of the attribute indicated in the request, and then identifying metadata within the contents of the attribute values based on this data format. In one embodiment, an LDAP repository uses a single format for storing data of a specific data type (e.g., jpegphoto EXIF for photo data), and processing logic only needs to identify metadata for this single format. Alternatively, the LDAP repository may store data of a specific data type in different formats. Then, processing logic may identify metadata for each individual format used for storing values of the attribute indicated in the request.

At block 206, processing logic identifies attribute subtypes for the attribute indicated in the request, based on the metadata determined at block 204. In one embodiment, processing logic identifies the attribute subtypes by parsing metadata of each relevant attribute value to find properties characterizing the contents of the attribute value, where the properties represent attribute subtype of the attribute indicated in the request. In one embodiment, in which the metadata is stored in the file in an encoded form, processing logic first decodes the metadata, and then parses it to identify the properties.

In one embodiment, processing logic stores the attribute subtype in the LDAP repository. Alternatively, processing logic provides the attribute subtypes as virtual attributes. For example, processing logic may return the attribute subtypes to a requestor without storing them in the LDAP repository.

Figure 3:
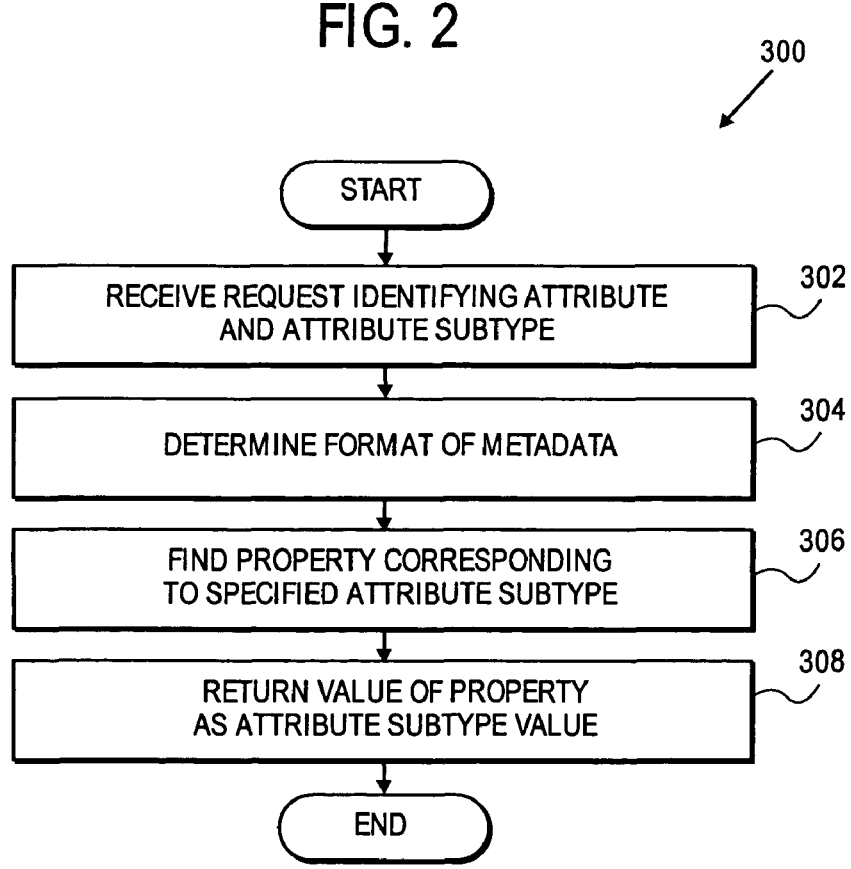
FIG. 3 is a flow diagram of one embodiment of a method for providing a value of an attribute subtype based on metadata associated with a relevant data type.

FIG. 3 illustrates a flow diagram of one embodiment of a method 300 for providing a value of an attribute subtype based on metadata associated with a relevant data type. The method may be performed by processing logic 1026 that may comprise hardware (e.g., circuitry, dedicated logic, programmable logic, microcode, etc.), software (such as instructions run on a processing device), or a combination thereof. In one embodiment, method 300 is performed by an LDAP directory server 108 of FIG. 1.

Referring to FIG. 3, process 300 begins with processing logic receiving a data request identifying an attribute and an attribute subtype (block 302). The attribute is associated with a specific data type. For example, the data request may ask for the value of "photo;dimensions" of a specific entry, with the attribute "photo" indicating a photo data type.

At block 304, processing logic determines the format of metadata contained in the value(s) of the specified attribute. In one embodiment, in which the request pertains to a single entry in the LDAP repository, processing logic determines the format of metadata by examining the value of the specified attribute and determining the format used for storing the contents of the value in the entry (e.g., by determining the type of the file stored as a value of the specified attribute). Alternatively, if the request pertains to multiple entries in the LDAP repository (e.g., a search request having a larger scope), processing logic determines the metadata format by examining the value of the specified attribute in each relevant entry, and determining the format used for storing the contents of the value in each entry.

At block 306, processing logic finds a property corresponding to the requested attribute subtype in the metadata and retrieves the value of this property. In one embodiment, processing logic uses a predefined correspondence between possible attribute subtypes and properties included in the metadata.

At block 308, processing logic returns the value of the property as an attribute subtype value to the requestor. In the example above, processing logic returns the dimensions of the image as the value of the "photo;dimensions" attribute subtype.

Figure 4:
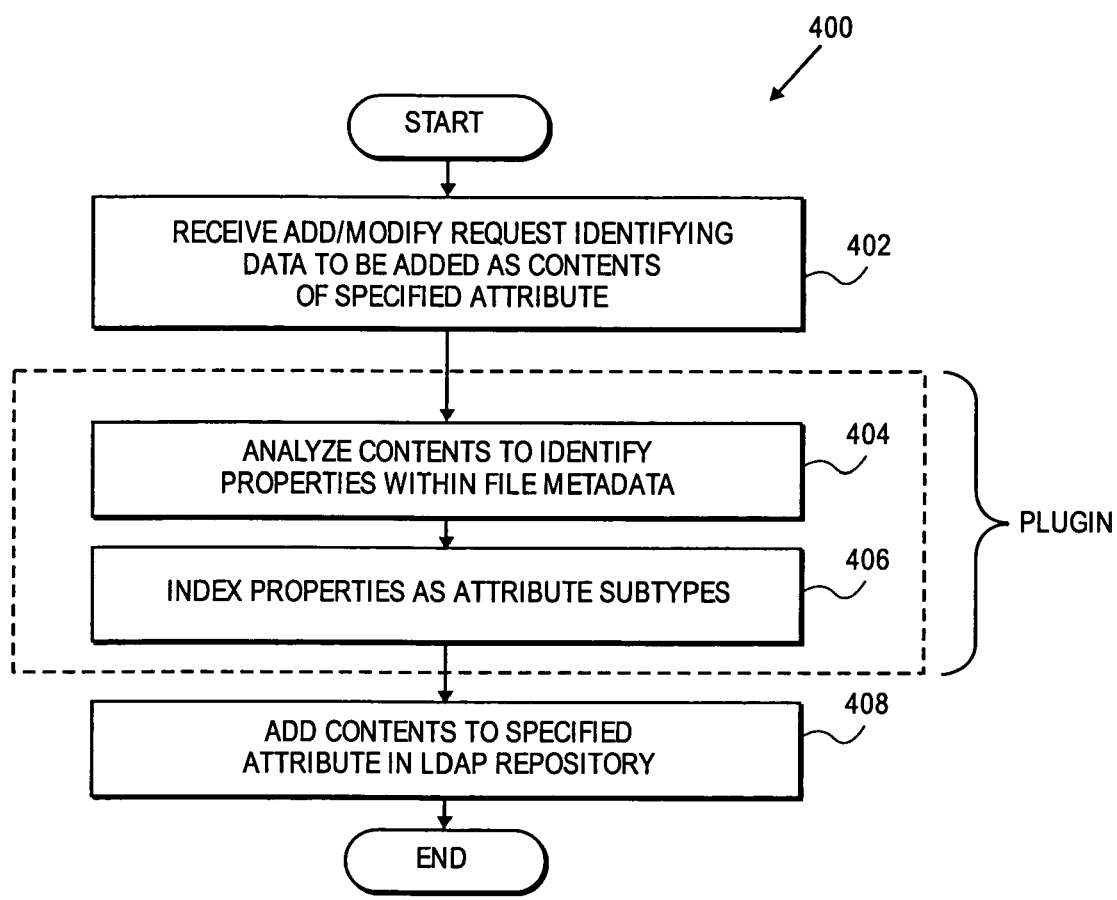
FIG. 4 is a flow diagram of one embodiment of a method for indexing metadata.

FIG. 4 is a flow diagram of one embodiment of a method 400 for indexing file metadata. The method may be performed by processing logic 1026 that may comprise hardware (e.g., circuitry, dedicated logic, programmable logic, microcode, etc.), software (such as instructions run on a processing device), or a combination thereof. In one embodiment, method 400 is performed by the directory server 108 of FIG. 1.

Referring to FIG. 4, process 400 begins with processing logic 1026 receiving, from a requestor (e.g., a user or an application), an add/modify request specifying data (e.g., jpeg file) to be added as the contents of an attribute (e.g., jpegphoto attribute) (block 402).

At block 404, processing logic 1026 analyzes the content to identify metadata and find properties within the metadata. The identified properties represent a set of attribute subtypes for the specified content.

At block 406, processing logic 1026 adds an index entry to the index for each identified property. In one embodiment, processing logic 1026 uses the specified attribute and the corresponding attribute subtype as the keys. In one embodiment, blocks 404 and 406 are performed by a plugin associated with the data type (or the file type such as jpegphoto EXIF) of the data requested to be added to the LDAP repository.

At block 408, processing logic 1026 adds the requested data (e.g., jpeg file contents) to the specified attribute (e.g., jpegphoto attribute) in the LDAP repository.

Figure 5:
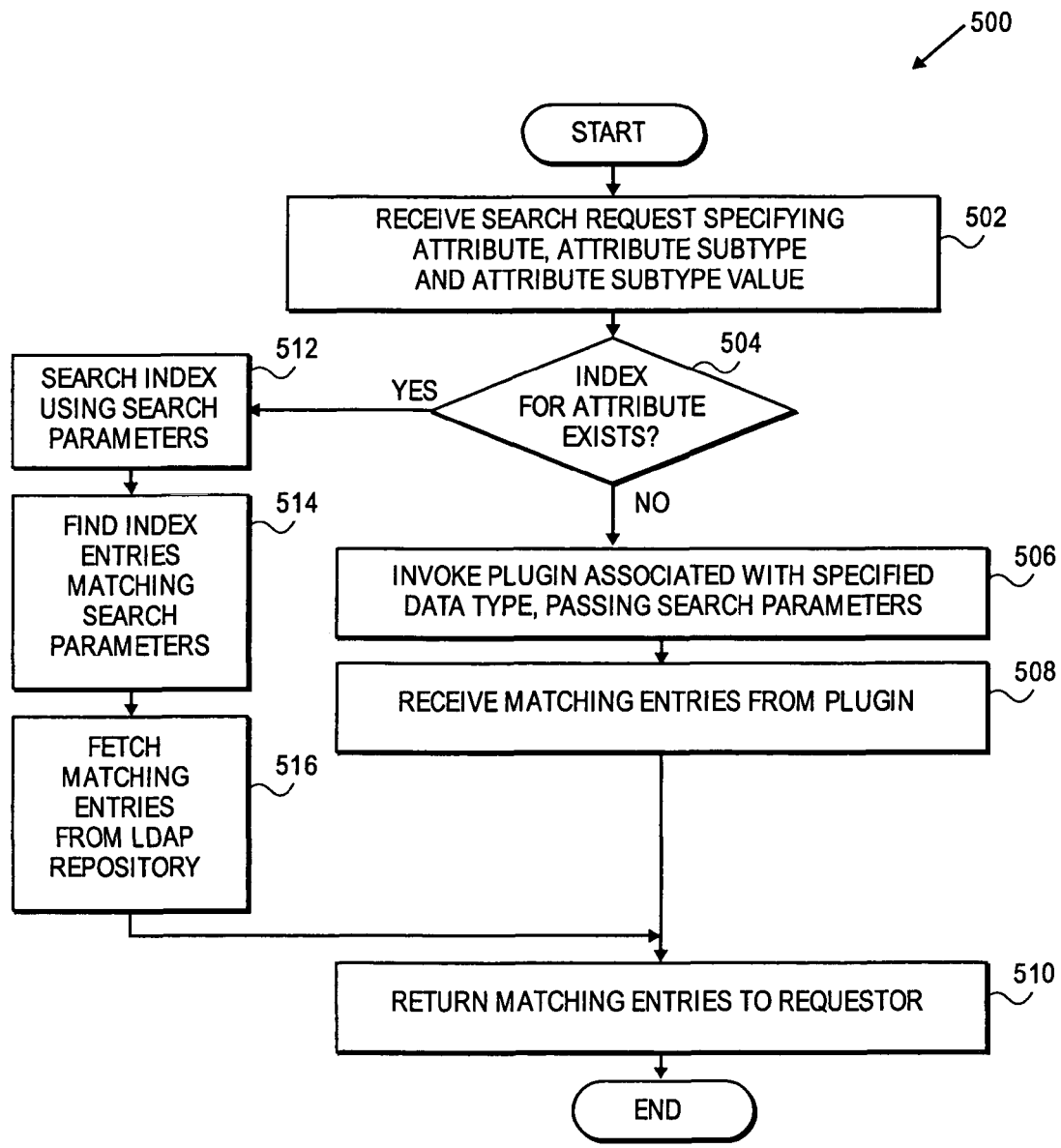
FIGS. 5 and 6 are flow diagrams of a method for searching LDAP repository entries using attribute subtypes, in accordance with some embodiments of the present invention.

FIG. 5 is a flow diagram of one embodiment of a method for searching LDAP repository entries using attribute subtypes. The method may be performed by processing logic 1026 that may comprise hardware (e.g., circuitry, dedicated logic, programmable logic, microcode, etc.), software (such as instructions run on a processing device), or a combination thereof. In one embodiment, method 600 is performed by the directory server 108 of FIG. 1.

Referring to FIG. 5, process 500 begins with processing logic 1026 receiving, from a requester, a search request specifying an attribute (e.g., a file type attribute such as jpegphoto), an attribute subtype and an attribute subtype value (e.g., horizSize: 300) (block 502).

At block 504, processing logic 1026 determines whether the index exists for the specified attribute. In one embodiment, processing logic 1026 makes this determination by searching the LDAP repository index using the attribute as the key.

If the index does not exist for the specified attribute, processing logic 1026 calls a plugin associated with the data type that corresponds to the specified attribute (e.g., a jpegphoto EXIF plugin), passing the search parameters (e.g., the file type attribute, the attribute subtype and the attribute subtype value) (block 506). In one embodiment, processing logic 1026 also provides a task identifier indicating that the plugin should perform a search (e.g., task ID=2 for searching). Alternatively, the plugin determines which task needs to be performed based on the passed information. The plugin then performs the required task, as will be discussed in more detail below in conjunction with FIG. 6.

At block 508, processing logic 1026 receives entries matching the search parameters from the plugin. At block 510, processing logic 1026 returns the matching entries to the requestor. If the index exists for the specified attribute (block 504), processing logic 1026 consults the index looking for the search parameters (e.g., jpegphoto; horizSize: 300) (block 512). Upon finding a list of index entries that match the search parameters (block 514), processing logic 1026 fetches the matching entries from the LDAP repository (block 516) and returns the matching entries to the requestor (block 518).

Figure 6:
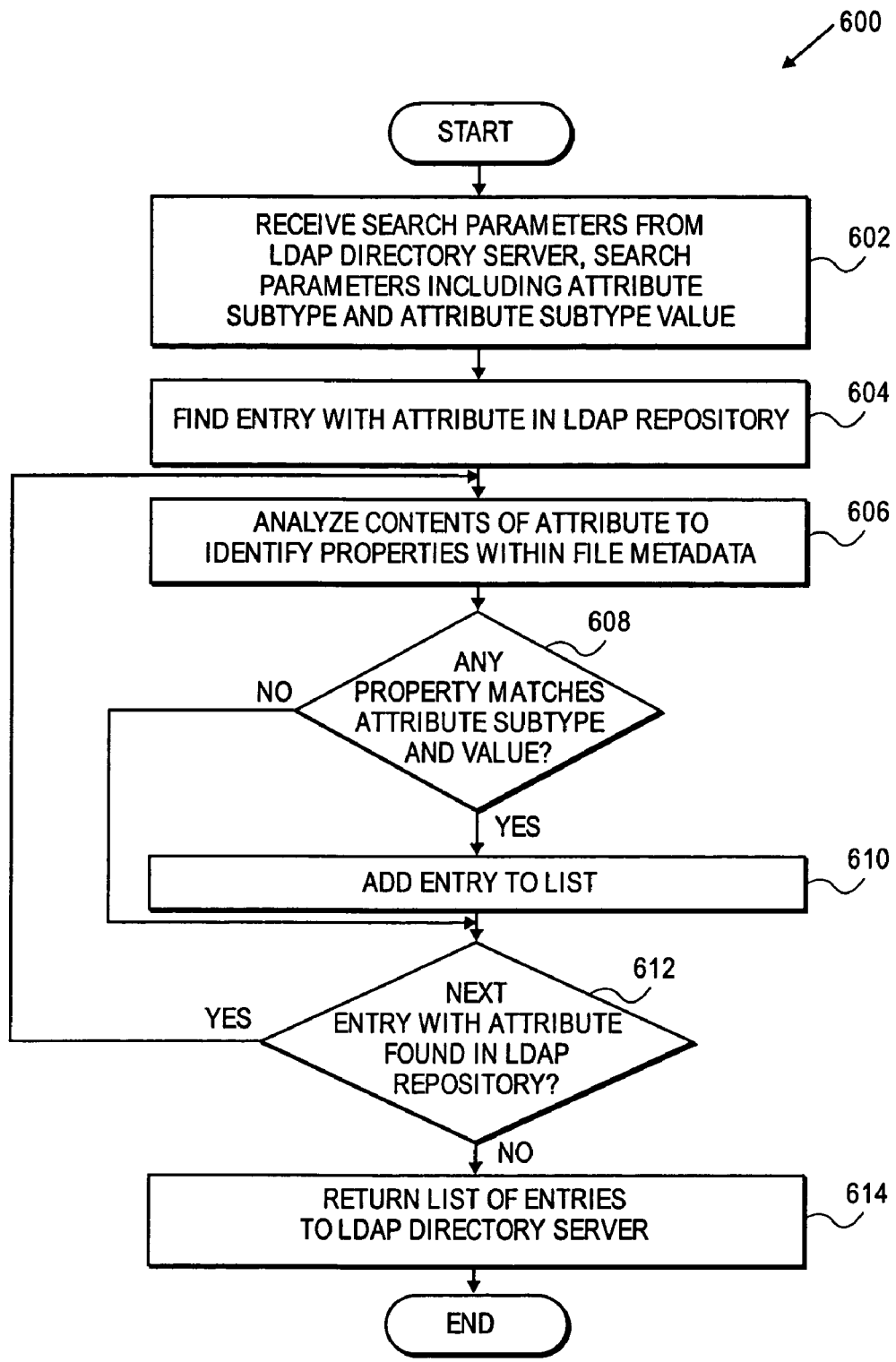

FIG. 6 is a flow diagram of one embodiment of a method for searching LDAP repository entries virtual attribute subtypes. The method may be performed by processing logic 1026 that may comprise hardware (e.g., circuitry, dedicated logic, programmable logic, microcode, etc.), software (such as instructions run on a processing device), or a combination thereof. In one embodiment, method 600 is performed by a data type plugin 110 of FIG. 1.

Referring to FIG. 6, process 600 begins with processing logic 1026 receiving search parameters from the LDAP directory server (block 602). The search parameters may include an attribute, an attribute subtype and an attribute subtype value (e.g., jpegphoto; horizSize: 300). In one embodiment, processing logic 1026 also includes data indicating that a search needs to be performed based on the search parameters (e.g., task ID=2 for searching.

At block 604, processing logic 1026 finds a first entry in the LDAP repository that matches the specified attribute. At block 606, processing logic 1026 analyzes the contents of the attribute in this entry to identify properties within the metadata. At block 608, processing logic 1026 determines whether any of the identified properties matches the specified attribute subtype and its value. If so, processing logic 1026 adds the entry to a list of found matches (block 610) and proceeds to block 612. If not, processing logic 1026 proceeds directly to block 612.

At block 612, processing logic 1026 determines whether another entry matching the specified attribute exists in the LDAP repository. If so, processing logic 1026 returns to block 606 to process this entry. If not, processing logic 1026 returns the list of matching entries to the LDAP directory server (block 614).

Figure 7:
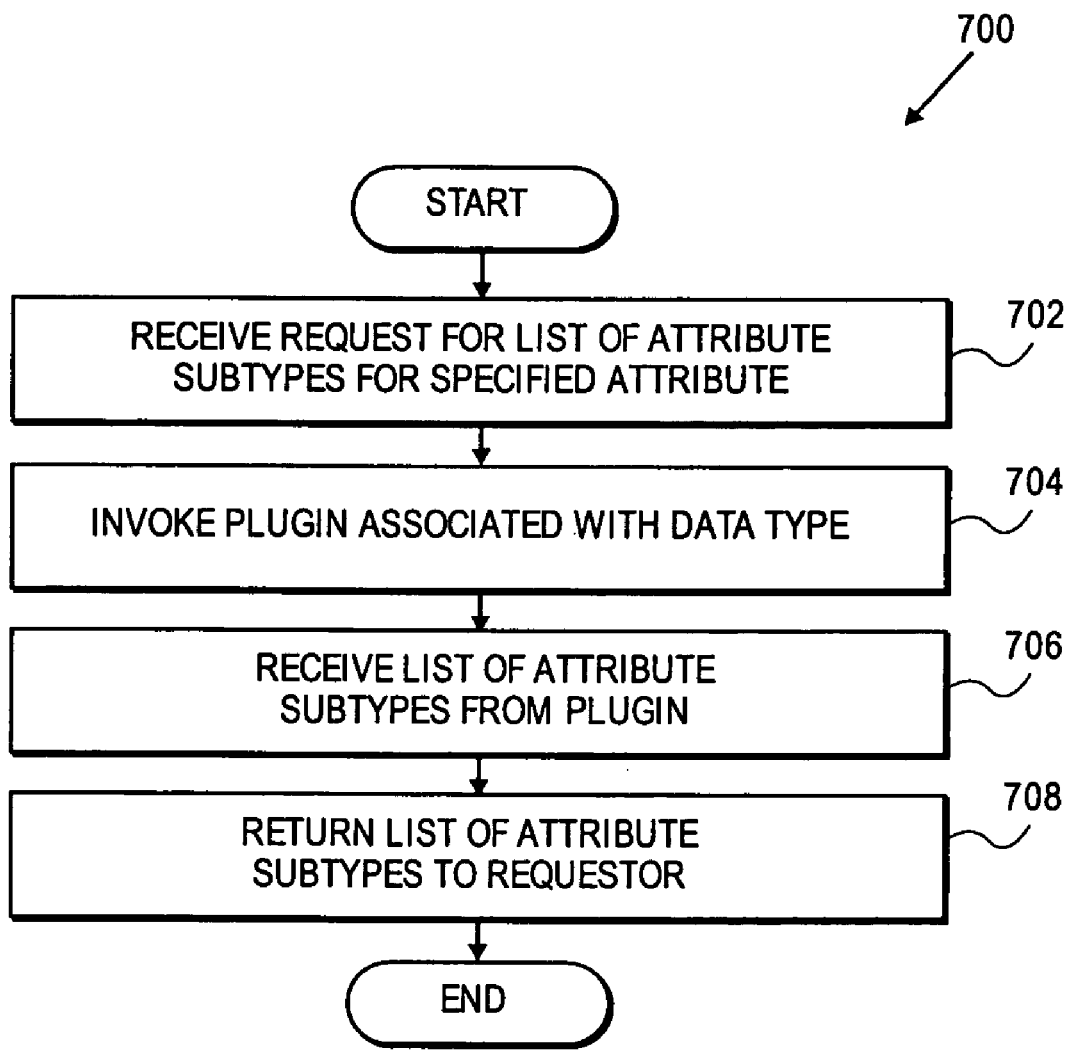
FIGS. 7 and 8 are flow diagrams of a method for providing a set of attribute subtypes for a specific attribute, in accordance with some embodiments of the present invention.

FIG. 7 is a flow diagram of one embodiment of a method 700 for providing a set of attribute subtypes for a specified attribute. The method may be performed by processing logic 1026 that may comprise hardware (e.g., circuitry, dedicated logic, programmable logic, microcode, etc.), software (such as instructions run on a processing device), or a combination thereof. In one embodiment, method 700 is performed by the directory server 108 of FIG. 1.

Referring to FIG. 7, process 700 begins with processing logic 1026 receiving, from a requester, a request for a list of attribute subtypes for a specified attribute (e.g., jpegphoto attribute) (block 702).

At block 704, processing logic 1026 calls a plugin associated with the data type that pertains to the specified attribute (e.g., a jpegphoto EXIF plugin). In one embodiment, processing logic 1026 also provides a task identifier indicating that the plugin should provide a list of attribute subtypes (e.g., task ID=3 for providing a list of attribute subtypes). Alternatively, the plugin determines which task should be performed based on the passed information. The plugin then performs the required task, as will be discussed in more detail below in conjunction with FIG. 8.

At block 806, processing logic 1026 receives a list of attribute subtypes from the plugin. At block 808, processing logic 1026 returns the list of attribute subtypes to the requestor. The requestor may then select an attribute subtype from the list, specify its value, and submit a new search request to the LDAP directory server.

Figure 8:
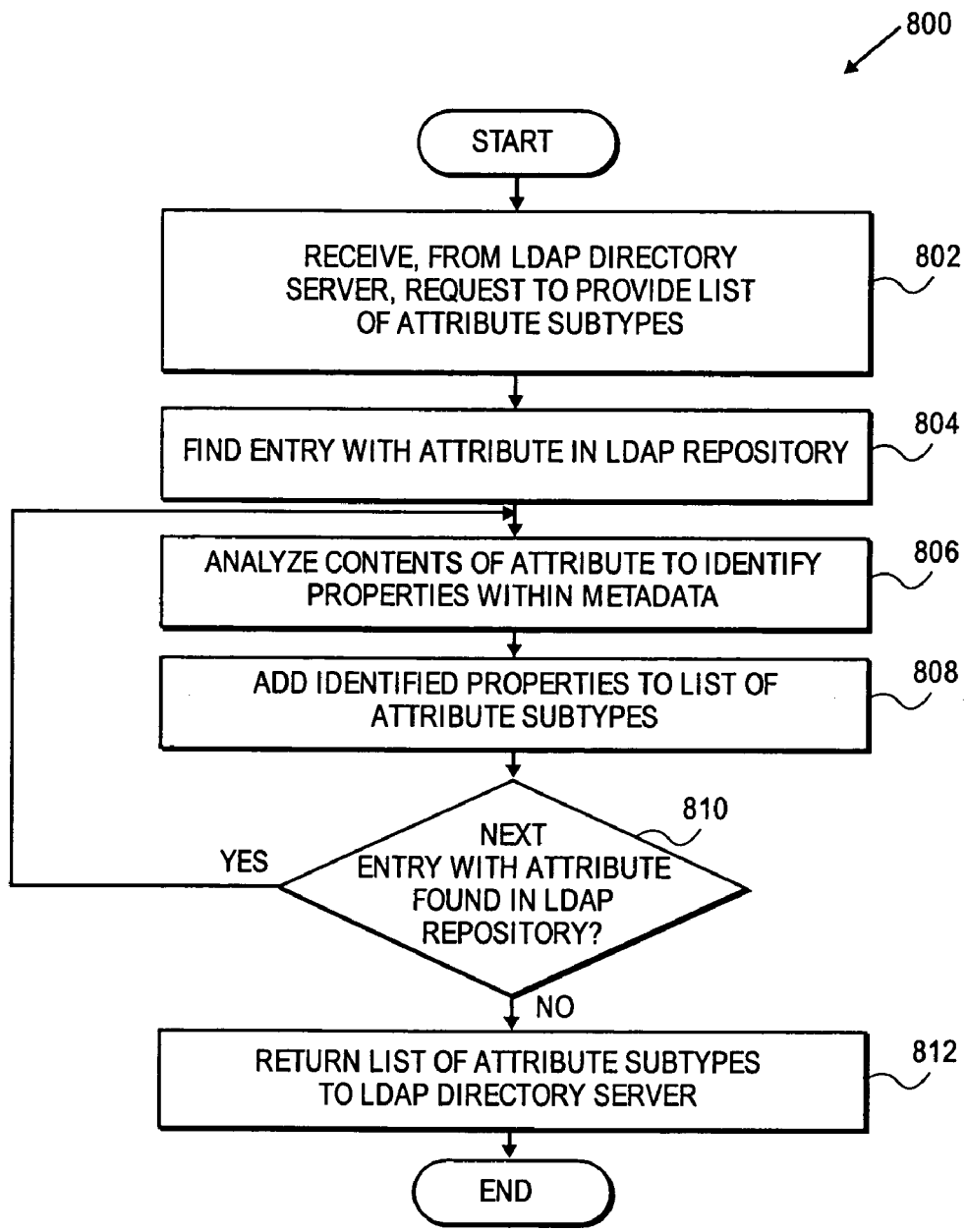

FIG. 8 is a flow diagram of one embodiment of a method 800 for providing a set of attribute subtypes for a specific file type. The method may be performed by processing logic 1026 that may comprise hardware (e.g., circuitry, dedicated logic, programmable logic, microcode, etc.), software (such as instructions run on a processing device), or a combination thereof. In one embodiment, method 800 is performed by a file type plugin 110 of FIG. 1.

Referring to FIG. 8, process 800 begins with processing logic 1026 receiving a request to provide a list of attribute subtypes for a specified attribute (e.g., file type attribute jpegphoto), from the LDAP directory server (block 802).

At block 804, processing logic 1026 finds a first entry in the LDAP repository that matches the specified attribute. At block 806, processing logic 1026 analyzes the contents of the file type attribute in this entry to identify properties within the file metadata.

At block 808, processing logic 1026 adds the identified properties to a list of attribute subtypes. At block 810, processing logic 1026 determines whether another entry matching the specified attribute exists in the LDAP repository. If so, processing logic 1026 returns to block 906 to process this entry. If not, processing logic 1026 returns the list of attribute subtypes to the LDAP directory server (block 714)

Figure 9:
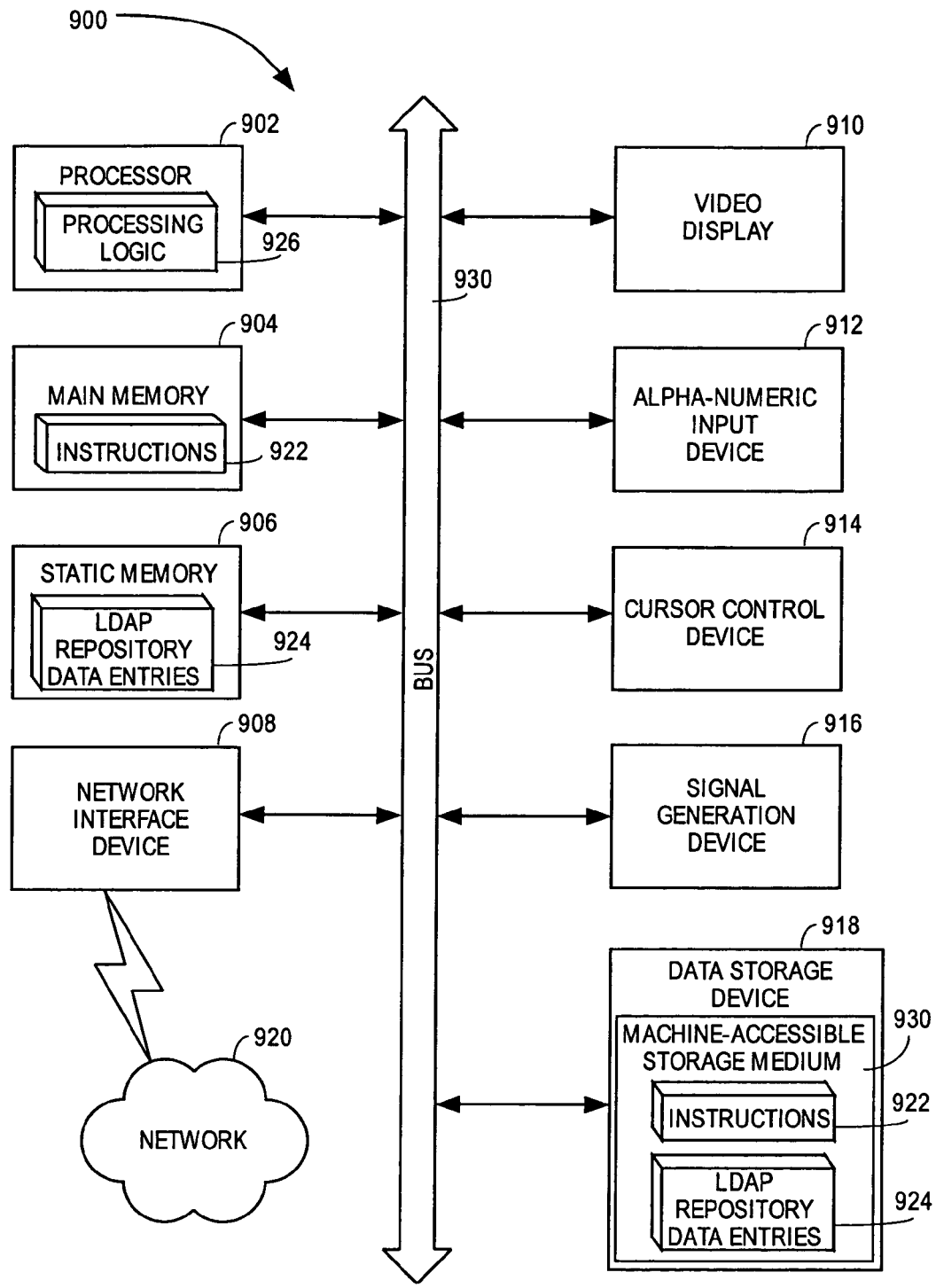
FIG. 9 illustrates a block diagram of an exemplary computer system implementing some embodiments of the present invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 930 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-accessible storage media. The software 922 may further be transmitted or received over a network 920 via the network interface device 908.

The machine-accessible storage medium 930 may also be used to store LDAP repository data entries 924. LDAP repository data entries 924 may also be stored in other sections of computer system 900, such as static memory 906.

While the machine-accessible storage medium 930 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

Thus, a method and apparatus for providing virtual LDAP attribute subtypes based on file metadata have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
receiving, at a Lightweight Directory Access Protocol (LDAP) directory server, a data request indicating an LDAP attribute and an LDAP attribute subtype, wherein the data request is a request for adding a data item to an LDAP repository as a value of the attribute, the LDAP attribute having one or more attribute values, each attribute value specifying data associated with at least one of a plurality of data types, the attribute subtype corresponding to a content property of the specified data, the associated data type having a distinct format for storing metadata within the specified data, wherein the identification of the distinct format of the metadata corresponding to the data type comprises: invoking a plugin associated with the data type, the plugin being one of a plurality of plugins associated with different data types;
in response to receiving the data request indicating the LDAP attribute, identifying,
using the LDAP directory server, the distinct format of metadata corresponding to the data type of each attribute value;
identifying a content property corresponding to the attribute subtype indicated in the data request using metadata pertaining to each attribute value;
returning a value of the content property for each attribute value; and
identifying properties within metadata associated with the data item, each identified property of the identified properties representing an attribute subtype of the attribute, and adding index entries for the attribute subtypes.

2. The method of claim 1 further comprising: creating the attribute subtype for the attribute in an LDAP repository.

3. The method of claim 1 further comprising:
creating virtual attribute subtypes for the attribute.

4. The method of claim of 1 wherein the data request is a search request for items having a matching attribute subtype and an attribute subtype value.

5. The method of claim 4 further comprising:
finding one or more entries in an LDAP repository that have the attribute indicated in the data request; and
for each of the found entries, searching metadata corresponding to an attribute value of the attribute for properties matching the attribute subtype and the attribute subtype value specified in the request.

6. The method of claim 4 further comprising:
determining that the attribute indicated in the data request has an index;
searching the index using the attribute subtype and the attribute subtype value specified in the request;
finding one or more matching index entries; and
fetching the matching entries from an LDAP repository.

7. The method of claim 1 wherein:
the data request is a request for a list of attribute subtypes for the attribute; and
the method further comprises
finding one or more entries in an LDAP repository that have the attribute indicated in the data request,
for each of the found entries, identifying properties within metadata corresponding to an attribute value of the attribute, and
compiling the list of attribute subtypes based on the identified properties.

8. The method of claim 1 wherein:
the data request is a request for a value of an attribute subtype of the attribute; and
the value of the content property is returned as a value of the attribute subtype.

9. The method of claim 1 wherein the data type is any one of a text document type, a binary document type, an image type, a photo type, an audio type, or a video type.

10. An apparatus comprising:
a network interface device to receive a data request indicating a Lightweight Directory Access Protocol (LDAP) attribute and an LDAP attribute subtype, wherein the data request is a request for adding a data item to an LDAP repository as a value of the attribute, the LDAP attribute having one or more attribute values associated with at least one data type,
each attribute value specifying data associated with at least one of a plurality of data types, the attribute subtype corresponding to a content property of the specified data, the associated data type having a distinct format for storing metadata within the specified data, wherein the identification of the distinct format of the metadata corresponding to the data type comprises: invoking a plugin associated with the data type, the plugin being one of a plurality of plugins associated with different data types;
a processor, coupled to the network interface device via a bus, to determine metadata corresponding to the data type of the attribute values in response to receiving the data request indicating the LDAP attribute, identify a content property corresponding to the attribute subtype indicated in the data request using metadata pertaining to each attribute value, and return a value of the content property for each attribute value;
and identifying properties within metadata associated with the data item, each identified property of the identified properties representing an attribute subtype of the attribute, and adding index entries for the attribute subtypes.

11. The apparatus of claim 10 wherein the processor is to create the attribute subtypes for the attribute in an LDAP repository.

12. The apparatus of claim 10 wherein the processor is to create virtual attribute subtypes for the attribute.

13. The apparatus of claim of 10 wherein the data request is a search request for items having a matching attribute subtype and an attribute subtype value.

14. The apparatus of claim 10 wherein the processor is further to:
find one or more entries in an LDAP repository that have the attribute indicated in the data request, and
for each of the found entries, search metadata corresponding to an attribute value of the attribute for properties matching the attribute subtype and the attribute subtype value specified in the request.

15. The apparatus of claim 10 wherein the processor is further to:
determine that the attribute indicated in the data request has an index, search the index using the attribute subtype and the attribute subtype value specified in the request,
find one or more matching index entries, and
fetch the matching entries from an LDAP repository.

16. An article of manufacture, comprising:
a non-transitory machine-accessible storage medium including data that, when accessed by a machine, cause the machine to perform a method comprising:
receiving, at a Lightweight Directory Access Protocol (LDAP) directory server, a data request indicating an LDAP attribute and an LDAP attribute subtype, wherein the data request is a request for adding a data item to an LDAP repository as a value of the attribute, the LDAP attribute having one or more attribute values, each attribute value specifying data associated with at least one of a plurality of data types, the attribute subtype corresponding to a content property of the specified data, the associated data type having a distinct format for storing metadata within the specified data, wherein the identification of the distinct format of the metadata corresponding to the data type comprises: invoking a plugin associated with the data type, the plugin being one of a plurality of plugins associated with different data types;
in response to receiving the data request indicating the LDAP attribute, identifying, using the LDAP directory server, the distinct format of metadata corresponding to the data type of each attribute value;
identifying a content property corresponding to the attribute subtype indicated in the data request using metadata pertaining to each attribute value;
returning a value of the content property for each attribute value; and
identifying properties within metadata associated with the data item, each identified property of the identified properties representing an attribute subtype of the attribute, and adding index entries for the attribute subtypes.

17. The article of manufacture of claim 16 wherein the method further comprises:
creating the attribute subtypes for the attribute in an LDAP repository.

18. The article of manufacture of claim 16 wherein the method further comprises:
creating virtual attribute subtypes for the attribute.

* * * * *